United States Patent [19]

Adamovsky

[11] Patent Number: 4,995,697
[45] Date of Patent: Feb. 26, 1991

[54] FIBER OPTIC SENSING SYSTEM

[75] Inventor: Grigory Adamovsky, Solon, Ohio

[73] Assignee: The United States of America as represented by the administrator of the National Aeronautics and Space Administration, Washington, D.C.

[21] Appl. No.: 404,291

[22] Filed: Sep. 7, 1989

[51] Int. Cl.⁵ .......................... G02B 6/02; G02B 6/16; G01B 9/02
[52] U.S. Cl. ................................. 350/96.29; 356/345; 250/227
[58] Field of Search ............... 350/96.15, 96.20, 96.21; 356/345, 350, 351, 352; 250/227

[56] References Cited

U.S. PATENT DOCUMENTS

| | | | |
|---|---|---|---|
| 3,542,472 | 11/1970 | Smith-Vaniz | 356/4 |
| 3,970,389 | 7/1979 | Mendrin et al. | 356/106 R |
| 4,492,464 | 1/1985 | Bourdet et al. | 356/4.5 |
| 4,627,728 | 12/1986 | Willson | 356/345 |
| 4,644,556 | 2/1987 | Petuchowski et al. | 372/97 X |
| 4,738,527 | 4/1988 | McBrien | 365/5 |
| 4,753,529 | 6/1988 | Latton | 250/227.27 |
| 4,768,880 | 9/1988 | Tur et al. | 356/345 |
| 4,789,240 | 12/1988 | Bush | 356/345 |
| 4,873,989 | 10/1989 | Einzig | 356/352 X |

Primary Examiner—Akm Ullah
Attorney, Agent, or Firm—Gene E. Shook; John R. Manning; James A. Mackin

[57] ABSTRACT

A fiber optic interferometer utilizes a low coherence LED laser as a light source which is filtered and driven at two RF frequencies, high and low, that are specific to the initial length of the resonator chamber. A displacement of a reflecting mirror changes the length traveled by the nonreferencing signal. The low frequency light undergoes destructive interference which reduces the average intensity of the wave while the high frequency light undergoes constructive interference which increases the average intensity of the wave. The ratio of these two intensity measurements is proportional to the displacement incurred.

4 Claims, 4 Drawing Sheets

FIBER OPTIC SENSING SYSTEM

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is directed to an improved sensing system. The invention is particularly concerned with an interferometer which employs frequency domain referencing.

A classical interferometer is based on generating a phase difference between two or more coherent fields. The fields may be optical, electrical, magnetic, gravitational, or other. The recombination of the fields produces an interference pattern, and the process of recombination is called interference.

An interference pattern comprises alternating zones with low and high field intensities. The alternation may occur either in space, in time, or in frequency domains. As the phase difference changes from 0 to $\pi$ the intensity of the interferometric pattern changes from a maximum to a minimum. The easiest way, but not the only way, to change the phase difference between the interfering fields is to introduce an additional path length in the path difference that already exists between the fields. Thus, one of the main applications of classical interferometry is distance measurement.

Several referencing techniques have been proposed in the prior art. One such system employs temporal referencing which has the advantage of using the same fiber link between the sensor head and the processing electronics for both the signal and the reference channels. These channels are generated along the fiber link in the time domain using a fiber-optic loop and a pulse-modulated light source to initiate a light pulse. A train of pulses of different amplitudes results. Information about the measurand is then retrieved from the relative amplitudes of the pulses in the train.

Another technique is based on analyzing the Fourier spectrum of the signal coming from the sensor to process pulses of short duration. Utilization of this technique permits short fiber-optic loops and minimizes the effects of the loop itself on the system performance.

Fiber optic loops used in sensing systems with temporally separated signal and reference channels represent a larger group of optical sensors which can be classified by configuration as interferometers. A feature common among this group of sensors is that they split the initial signal into two or more signals, delay one of these signals with respect to the others, and then recombine them producing a resultant signal. Depending on the application, properties and driving conditions for the light sources, as well as parameters of the sensors can be chosen such that the sensor heads perform either as interferometers or as delay lines.

Sensor heads that are configured to perform as delay lines have been referred to as fiber optic loops which were previously mentioned. Sensors incorporated in the fiber optic loops are intensity modulating sensors. They react to changes in a measured parameter by changing intensity of the light propagating through the loop.

Sensor heads that perform as interferometers have been used in various phase measuring devices and sensing systems based on phase modulation. In such applications optical frequency is usually employed, and a phase difference between recombining signals is utilized to determine the measured parameter. As the phase difference changes either in the space, time, or frequency domains, the resultant signal changes its value from some maximum when the phase difference is a multiple of $2\pi$ to some minimum when the phase difference is an odd multiple of $\pi$.

The swing from a maximum to a minimum value is known from optical interferometry as fringe visibility or fringe contrast. Among the parameters that affect fringe visibility are the amplitudes of the interfering signals or intensities of the interfering light beams. Equal amplitudes of the interfering signals or equal intensities of the interfering beams give the highest fringe visibility assuming that the other factors affecting the visibility remain unchanged.

A disadvantage of the referencing technique using temporarily separated signal and reference channels lies in the practical limits of a pulsed source and a fiber optic loop. The optical length of the loop L and the duration of the pulse t are related. For a double pulse generated by the loop the relationship is: $L > 2ct$ or $t < L/2c$, where c is the speed of light in a vacuum.

Thus, a source employed for generating a train of pulses by using a short loop must have a wide band width and a short rise and fall time. The shorter the loop the shorter both the rise and fall times have to be.

At the same time signal processing techniques based on spectral analysis of a train of pulses involves filtering either selected components of the Fourier spectrum or entire sections of the spectrum. This affects the power efficiency of the sensing system.

It is, therefor, a purpose of the invention to provide a sensing system with the reference and signal channels separated in the frequency at the main in order to compensate for changes in the transmission of the fiber link and light source intensity variations.

BACKGROUND ART

Smith-Vaniz patent No. 3,542,472 discloses a displacement measuring apparatus having two or more frequencies simultaneously occurring. Tur et al patent No. 4,768,880 describes a device which utilizes a multimode laser diode with a low coherence that is substantially shorter than the length being measured. Any suggestions of intensity modulation in either of these patents is incidental inasmuch as it is generally the result of phase modulation. It would appear that the device shown in the Tur et al patent must overcome the same inherent disadvantages of any system using current laser diodes. The Smith-Vaniz patent shows the relationship between intensity and displacement.

Menderin et al patent No. 3,970,389 is concerned with a displacement measuring apparatus that varies laser frequencies to determine an unknown distance. A photodetector is used to monitor the intensity of a phase shifted monochromatic light source. The shifts in both phase and frequency allow for the resolution of ambiguity resulting from the unknown initial position.

Bourdet et al patent No. 4,492,464 is concerned with a displacement measuring apparatus which utilizes dual frequencies from dual source lasers. While this patent shows the use of dual frequencies, their use is for the resolution of ambiguities. This device appears to be an improvement over the apparatus shown in the Menderin et al patent.

DISCLOSURE OF THE INVENTION

A classical interferometer is capable of measuring a displacement by having a single coherent light source split into two different light paths. One of these paths is a reference path of known length and the second path length is initially known, but it is variable. By lengthening or contracting this second path, phase shifts in the recombined light can be measured and are proportional to this displacement that occurred.

The present invention differs from the classical example in that path difference between the interfering fields is kept constant, but the relative intensities of the interfering fields vary. To achieve this the light source is driven at two RF frequencies that are specific to the initial length (L) of a resonator chamber. The low modulating frequency (LF) is exactly one-half the frequency of a high modulating frequency (HF).

In the initial condition, the two intensities of the two frequencies are monitored. Because of the two RF frequencies relationship to one another, the LF signal undergoes destructive interferences which reduces the resultant signal at LF frequency. Furthermore, the HF signal undergoes constructive interference which increases the resultant signal at HF frequency. This procedure enables LED sources to be used, together with multi-mode cabling. The use of two RF frequencies and rationing the resultant signals obtained at these frequencies eliminate the need to take into account intensity losses external to the resonator chamber, because these losses effect LF and HF proportionately.

The present invention is based on a phenomenon that occurs in an interferometer; namely a contrast modulation by changing the relative intensity of the interfering fields. An observable or a measure of the interference pattern is the contrast. Besides the phase difference, three variables are involved in the determination of this contrast;
(a) relative intensities of the interfering fields,
(b) mutual coherence of the fields,
(c) polarization states of the fields.

In the present invention the variables are the relative intensities of the interfering fields. It is assumed that the mutual coherence and the polarization states of the fields remain unchanged. It is further assumed that the phase difference between the interfering fields does not change either.

BRIEF DESCRIPTION OF THE DRAWING

The objects, advantages and novel features of the invention will be more fully apparent from the following detailed description when read in connection with the accompanying drawings in which like numbers are used throughout to identify like parts.

BEST MODE FOR CARRYING OUT THE INVENTION

Figure 1:
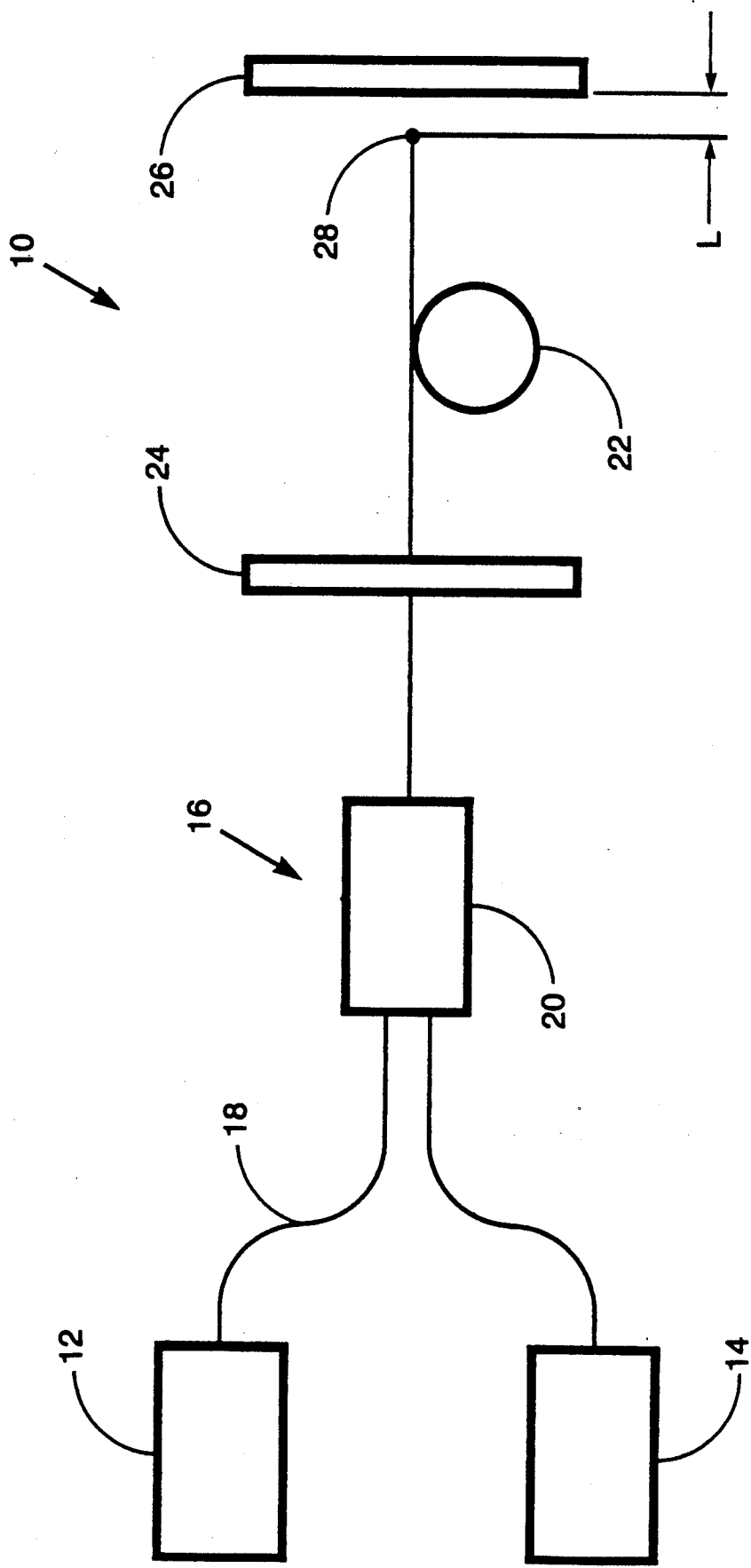
FIG. 1 is a schematic view of a sensing system constructed in accordance with the present invention.

A fiber optic sensing system constructed in accordance with the present invention comprises a sensor head 10 configured as an interferometer, a light source 12 that is amplitude modulated at RF frequencies, a photodetector 14 with signal processing electronics, and fiber optic link 16 connecting the sensor head and the detector. As shown in FIG. 1 an RF modulated light source 12 sends an initial signal towards the sensor head 10 via a fiber optic cable 18 through a coupler 20.

The sensor head 10 is configured as a Fabry-Perot type interferometer with approximately a one meter long piece of multimode fiber 22 placed between two mirrors 24 and 26. The mirror 24 is a semireflecting-semitransmitting mirror while the mirror 26 is a reflector and contains a sensing element. The sensing element incorporated in the mirror 26 is an intensity modulating sensor. The light intensity modulation is achieved by changing the amount of power coupled back into the loop on reflection from the mirror 26. This coupled back power is monitored by varying a distance L between the fiber end 28 and the reflective surface of the mirror 26.

Two RF frequencies, 50 MHz ad 100 MHz, are used to modulate the initial intensity of the light source 12. The modulating frequencies are chosen such that an interference occurring over the length of fiber in loop is a constructive one for the 100 MHz modulating frequency and a destructive one for the 50 MHz frequency. The interference occurs at the mirror 24 at each modulating frequency independently.

The interference results from the superposition of a portion of the initial signal reflected from the partial mirror 24 and the other portion of the initial signal that enters the loop 22, reflects from the mirror 26, propagates through the loop 22 in the reverse direction, and exits the loop through the mirror 24. If intensities of the interfering portions of the initial signal are equal, then the fringe visibility or contrast, and the effect of the interference will be maximized. In this case, an interference observed at 100 MHz would be completely constructive and the signal at this frequency would reach the maximum value. At the same time an interference at 50 MHz would be completely destructive with no signal detected at this frequency. However, a departure from this extreme condition leads to a loss of the fringe visibility or contrast. The loss of the contrast manifests itself in a decrease in the magnitude of the signal at 100 MHz and increase in the magnitude of the signal at 50 MHz.

This principle is used in the sensing system of the present invention to measure the distance L between the end 28 of the fiber 22 in the loop and the mirror 26. The change in the distance L leads to a change in amplitudes of signal detected at both modulating frequencies, 50 MHz and 100 MHz. However, if the amplitude of the signal at one frequency increases with the change in the distance L, the amplitude of the signal at the other frequency would decrease. The ratio of these amplitudes is independent of losses in the fiber optic link 16 connecting the sensor head 10 with both the source 12 and the photodetector 14.

ALTERNATE EMBODIMENTS OF THE INVENTION

Figure 2:
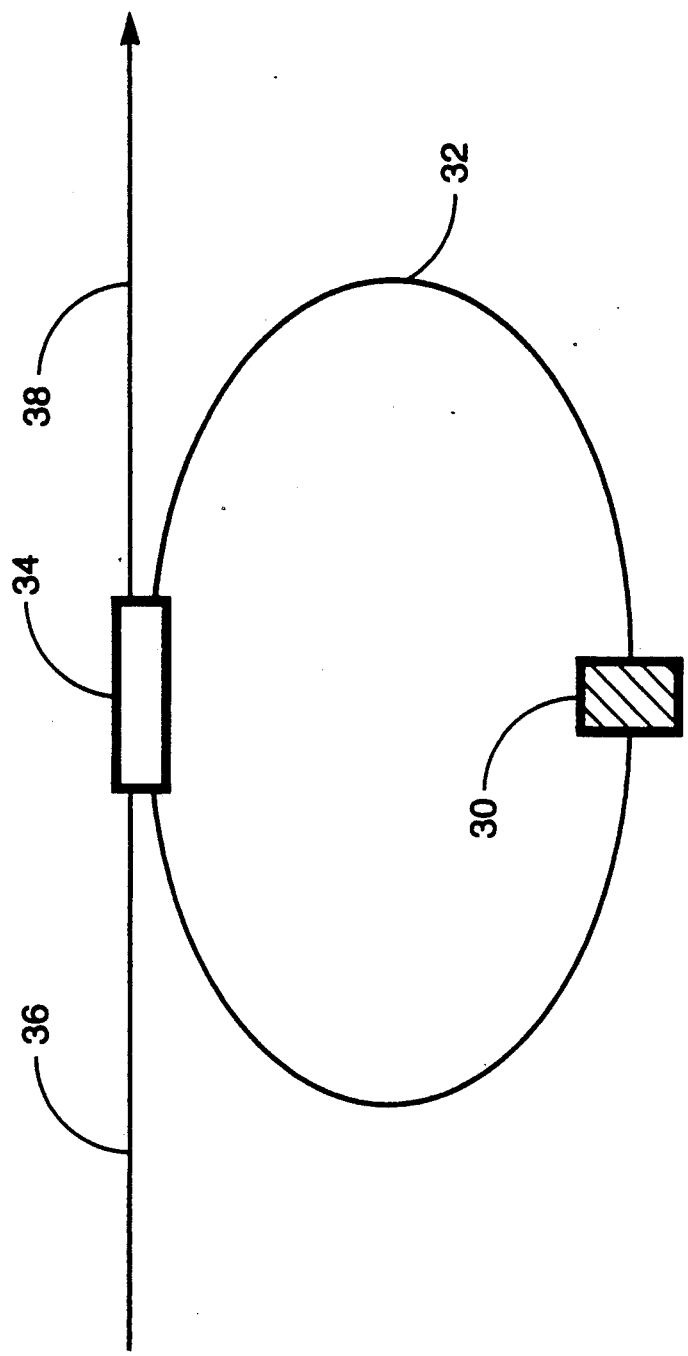
FIGS. 2, 3, and 4 are schematic views showing alternate embodiments of the invention.
Figure 3:
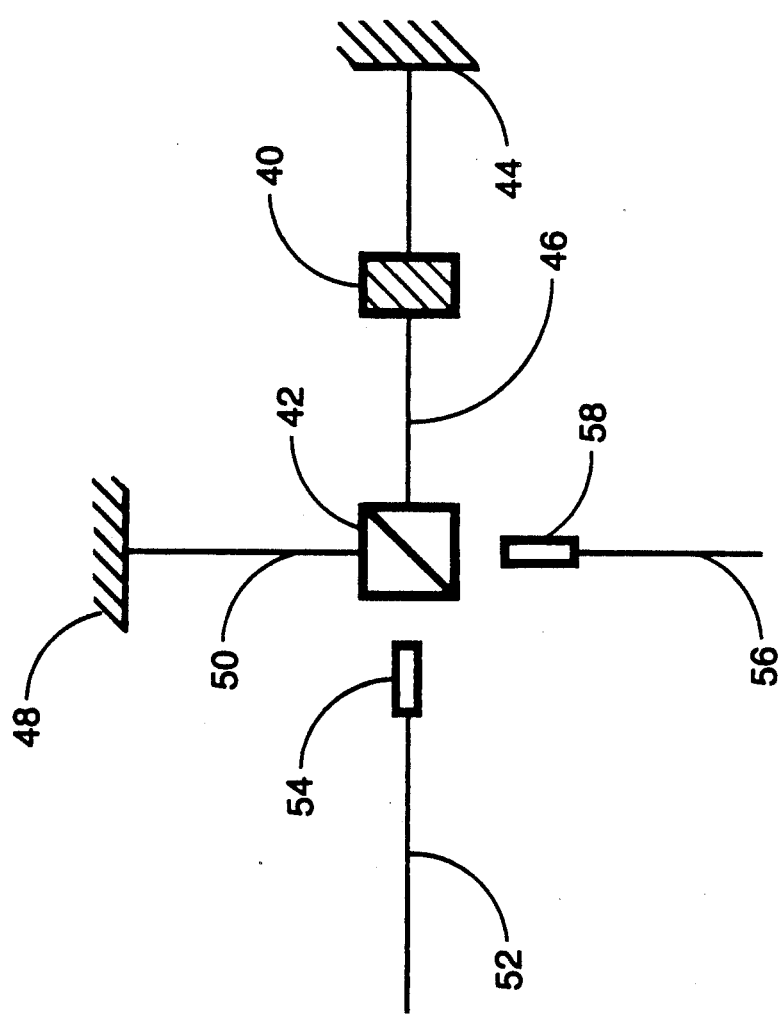
Figure 4:
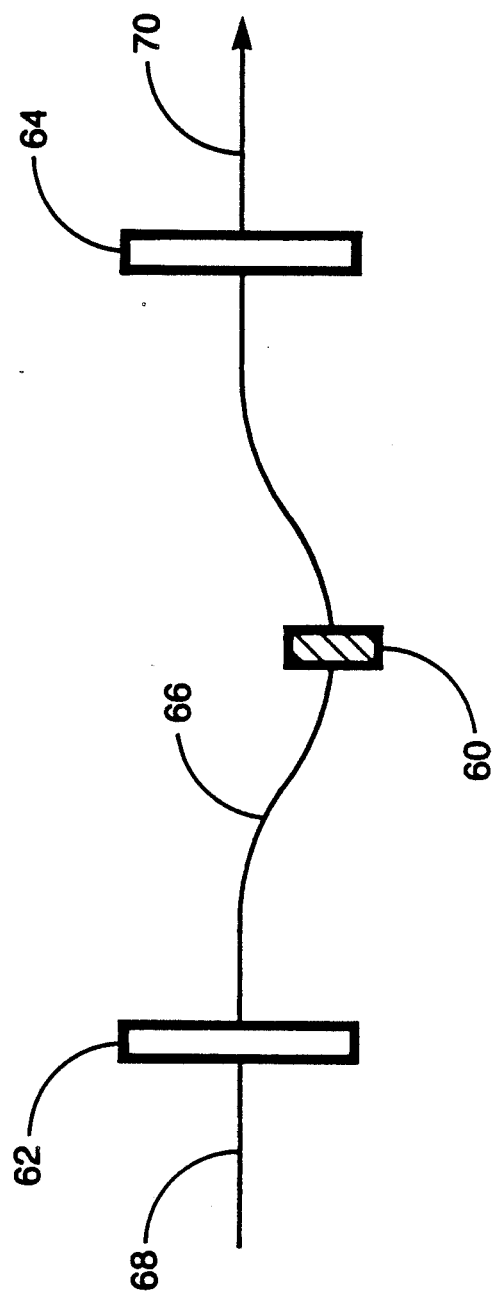

Any interferometric configuration can be used as a sensor head. FIGS. 2, 3 and 4 represent examples of different configurations of the sensor head. The common feature for these sensor heads is the relationship between the difference in the length of the arms of the interferometers used as sensor heads and the modulating RF frequencies. More particularly, any kind of amplitude modulating sensor that changes the intensity of the signal can be incorporated in one of the arms of the interferometric sensor head.

As shown in FIG. 2, such a sensor 30 is incorporated in a loop 32 that is connected to a coupler 34. Light enters the coupler 34 via a fiber optic cable 36 and exits via a similar cable 38.

In FIG. 3 a similar sensor 40 is positioned between a coupler 42 and a mirror 44 connected by a fiber optic cable 46. A second mirror 48 is likewise connected to the coupler 42 by a fiber optic cable 50. Light is directed to the coupler 42 by a fiber optic cable 52 that is terminated with a graded index lens 54 adjacent to the coupler 42. Light is directed away from the coupler 42 by a fiber optic cable 56 having a graded index lens 58 adjacent to the coupler 42. Both lenses 54 and 58 function as fiber optic collimators.

Referring to FIG. 4 a sensor 60 is positioned between two mirrors 62 and 64 connected by a fiber optic cable 66. Incoming light is directed toward the mirror 62 by a fiber optic cable 68 while a similar cable 70 directs light away from the mirror 64.

The technique is not limited to radio frequencies. The same effect could be observed at optical frequencies if both the optical path difference in the interferometric sensor head and the wavelengths used are chosen accordingly. The radio frequency modulation facilitates the use of shorter fiber optic loops than the pulsed technique. Constructive and destructive interference has been deserved in a 0.4 meters long fiber loop using 250 MHz and 125 Mhz modulating frequencies.

While several embodiments of the fiber optic sensing system have been described various modifications may be made without departing from the spirit of the invention or the scope of the subjoined claims so long as the sensing system employs an optical source having the amplitude modulated at such frequencies that constructive and destructive interference occur in the sensor head. Also, an intensity sensor must be incorporated in one of the arms of the interferometric sensor head to generate changes in the fringe visibility of the interferometric pattern due to changes in the measured parameter. In each embodiment the referencing technique is based on the separation of signal and reference channels in the modulation frequency domain.

I claim:

1. A fiber optic sensing system responsive to an independent sensed parameter comprising
   a light source for sending an initial signal intensity modulated at RF frequencies,
   an interferometric sensor head for receiving said initial signal, said sensor head having a plurality of arms for splitting said signal and recombining the same thereby forming an interference field,
   means for generating changes in the relative intensities of the split signal propagating in said arms in response to alterations in said independent sensed parameter thereby producing variations in said interference field, said means including
   sensing elements in at least one of said arms in said interferometric sensor head to generate said changes in said relative intensities of said split signal, said sensing elements being exposed to said sensed parameter,
   a photodetector for monitoring said variations, and
   a fiber optic link for transmitting said signal between said light source, said interferometric sensor head, and said photodetector.

2. A fiber optic sensing system as claimed in claim 1 including means in one of said arms for altering the intensity of the split signal in said arm so that an interference occurring in said sensor head is constructive for one modulating frequency and destructive for another frequency and the ratio of signals obtained at said frequencies is independent of the intensity of the initial signal and exhibits maximum sensitivity to changes in said independent sensed parameter.

3. A fiber optic sensing system comprising
   a light source for sending an initial signal intensity modulated at RF frequencies,
   an interferometric sensor head for receiving said initial signal, said sensor head comprising a Fabry-Perot type interferometer including
   an pair of spaced mirrors, one of said mirrors being semireflecting-semitransmitting and the other mirror being a reflector, and
   a loop of optical fibers interposed between said mirrors, said loop having an end spaced from said reflector a predetermined distance thereby forming said sensing element whereby the amount of light coupled back into said fiber loop upon reflection from said reflector is modulated in response to a change in said predetermined distance thereby generating variations in said interferometric field,
   a photodetector for monitoring said variations, and
   a fiber optic link for transmitting said signal between said light source, said interferometric sensor head, and said photodetector.

4. A fiber optic sensing system as claimed in claim 3 wherein said other mirror contains the intensity modulating sensing element.

* * * * *